3,458,587
PREPARATION OF β-ISOPROPYLNAPHTHALENE
George Suld, Springfield, Pa., assignor to Sun Oil Company, Philadelphia, Pa., a corporation of New Jersey
Filed Nov. 14, 1967, Ser. No. 682,894
Int. Cl. C07c 15/24, 3/54
U.S. Cl. 260—668                                 6 Claims

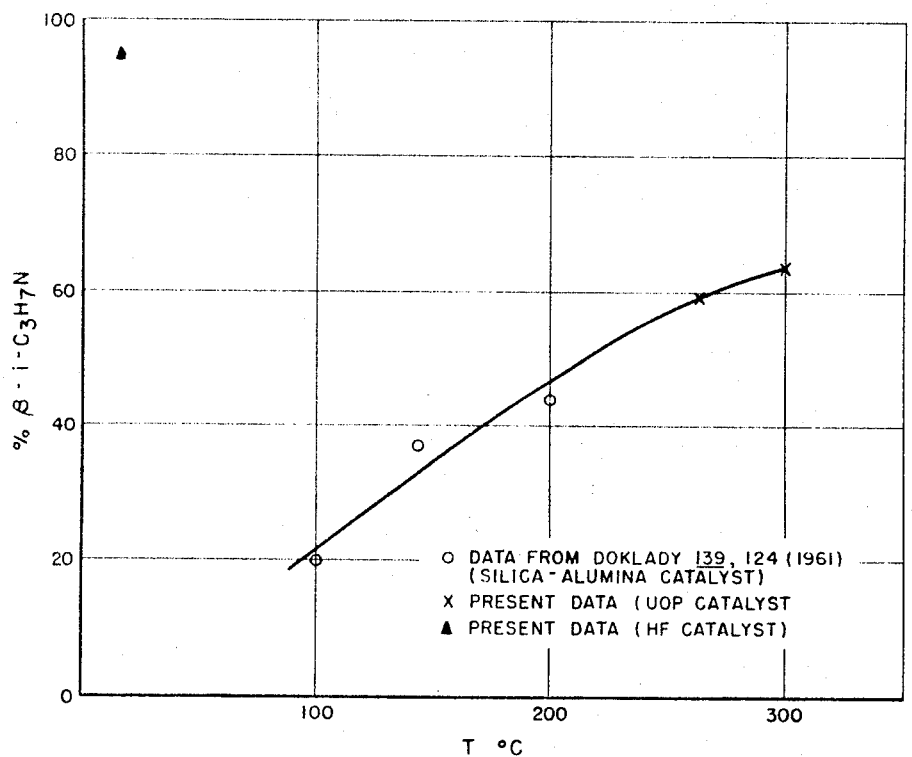
2-ISOPROPYLNAPTHALENE CONTENT IN THE
MONO-ALKYLATE VS. THE ALKYLATION TEMPERATURE

United States Patent Office 3,458,587
Patented July 29, 1969

ABSTRACT OF THE DISCLOSURE

β-Isopropylnaphthalene and β-2-sec.-butylnaphthalene are prepared to the substantial exclusion of the corresponding α-isomer in greater than ninety percent purity by a continuous two-stage process comprising (1) the alkylation of naphthalene with propylene or butylene under controlled reaction conditions in the presence of a phosphoric acid catalyst and an activator therefor comprising an alcohol or water to form a mixture of the α- and β-isomers, followed by (2) the isomerization of the isomeric mixture in the presence of anhydrous hydrofluoric acid catalyst to obtain the monoalkylate consisting of greater than ninety percent of the β-isomer of the alkylnaphthalene.

BACKGROUND OF THE INVENTION

This invention relates to the preparation of certain alkylnaphthalenes. More particularly, this invention relates to a continuous two-stage process for the preferential formation of the β-isomers of monoalkylnaphthalenes to the substantial exclusion of their corresponding α-isomers and polyalkylates. Still more particularly, this invention relates to an improved process for the preparation of β-isopropylnaphthalene and β-2-sec. - butylnaphthalene in high yield and purity by an alkylation-isomerization process under selected conditions.

The alkylation of aromatic compounds such as naphthalene with olefins generally produces more than one isomeric form of the alkylated product. A suitable means for obtaining the β-isomer in high yield and purity from such a mixture is desirable, since, for example, the β-isomer of isopropylnaphthalene is a valuable intermediate in the preparation of β-naphthol and acetone, and such a conversion can be interfered with by the presence of other isomers. However, it is usually quite difficult to separate these isomers by conventional means because of their closely related boiling points.

Methods for the selective formation of preferred alkylnaphthalene isomers, and particularly the β-isomer, by controlled alkylation and isomerization, starting with naphthalene and an olefin, have been proposed in the prior art. Thus, German Patent No. 936,089 describes a method for maximizing the yield of β-isopropylnaphthalene by optimizing the catalyst-charge contact time during the alkylation of naphthalene with propylene. Also in accordance with this teaching, formation of the monoalkylate is favored over the dialkylates and polyalkylates by controlling the molar ratios of naphthalene to propylene. However, this process is also characterized by (1) its batch-type operation with the need for the subsequent separation of the product from the catalyst, and (2) the formation not only of the unwanted α-isomer, but also substantial yields of the equally undesired dialkylates and polyalkylates in the amount of at least 15% of the total product despite the controlling of the ratios of starting materials.

U.S. Patent No. 2,623,911 likewise teaches a method for increasing the yield of β-alkylnaphthalene over the α-isomer by selected alkylation conditions. The simultaneous or subsequent isomerization of the resulting α- and β-isomeric mixture is also provided in order to further increase the yield of the β-isomer. The resulting product, however, comprises at best about an 80:20 mixture of the β- and α-isomers respectively, and the patentees therefore found it necessary to recover on each pass only a minor proportion of the desired β-isomer from this mixture by crystallization from alcohol, followed by recycling of the remaining 50:50 isomeric mixture to additional isomerization and crystallization treatments. Such subsequent isomerization steps yielded optimally only about 76% pure β-isomer with the remainder of the mixture comprising both α-isomer and polyalkylates.

It is, therefore, an object of this invention to provide a process for preparing β-alkylnaphthalenes of high isomeric purity. It is a further object of this invention to provide a continuous process whereby β-alkylnaphthalenes may be selectively produced to the exclusion of the α-isomer under such conditions as to yield the desired β-isomer in high purity, generally an amount exceeding 90% of the resultin isomeric mixture. It is still a further object of this invention to provide an alkylation-isomerization process whereby not only is the resulting β-isomer over 90% pure, but also the formation of unwanted polyalkylates is suppressed, thereby enhancing the percentage conversion of the starting materials and increasing the overall yield of the desired β-isomer.

SUMMARY OF THE INVENTION

It has now been found, in accordance with the present invention, that the β-isomers of monoalkylnaphthalenes, and particularly those having from three to four carbon atoms in the alkyl side chain, may be produced in high yield and purity by the following two-stage continuous process. Briefly, said process comprises, first, the catalytic vapor phase alkylation under specified conditions, of naphthalene with propylene, butene-1, or butene-2 over a solid phosphoric acid catalyst activated with water or an alcohol, preferably one which corresponds to the olefin used in the alkylation. The resulting alkylate, consisting principally of a mixture of α- and β-monoalkylnaphthalenes, is then degassed and contacted in a separate reactor with anhydrous hydrofluoric acid to afford a mixture of essentially unreacted naphthalene and a monoalkylate consisting of highly pure, and preferably greater than 90%, of the β-alkylnaphthalene isomer and less than 10% of the corresponding α-isomer.

BRIEF DESCRIPTION OF THE DRAWING

FIGURE 1 is a graph showing the β-isopropylnaphthalene content in the monoalkylate obtained by certain prior art workers at given alkylation temperatures in a one-stage alkylation process. Data obtained in accordance with the alkylation conditions of the present process are also plotted on the graph, as well as the amount of β-isopropylnaphthalene obtained by the combined alkylation-isomerization step of the instant two-stage process.

DESCRIPTION OF THE PREFERRED EMBODIMENTS

The first stage of the process comprises the catalytic vapor phase alkylation of naphthalene with propylene, butene-1, or butene-2 in the presence of a solid phosphoric acid catalyst under certain specified conditions of time, temperature, ratios of feed material, and space velocities of the feed charges. These optimal reaction conditions are important not only for maximizing the β-isomer content of the alkylate, but also to maximize the formation of monoalkylnaphthalenes and suppress the formation of unwanted polyalkylates.

The alkylation reaction is desirably carried out by contacting naphthalene which has been dissolved in an inert organic solvent with propylene or butylene in the presence of a catalyst bed containing a solid phosphoric acid catalyst which is activated with water, or isopropyl or butyl alcohol, respectively, at a temperature of from 150° to 350° C. and preferably from about 250°–300° C. As shown in FIGURE 1, as the temperature decreases, the β-isomer content in the alkylate likewise decreases markedly. On the other hand, at temperatures above about 350° C. deactivation of the catalyst occurs.

In addition to controlling the alkylation temperature within the above-specified ranges, it is also essential that the liquid hourly space velocity (LHSV), based on the volume of active catalyst alone, be within the range of from about 1.0 to 20.0, and preferably from 3–6, for the combined liquid charge of the olefin, dissolved naphthalene, and alcohol and water, and about 0.1–1.0 LHSV for the naphthalene alone. At velocities below or above these ranges, the percentage yield of the β-isomer drops off markedly because of the slow through-puts or shortened contact time with the catalyst, respectively. The mole ratio of naphthalene to olefin should preferably be in the range of from 1:1 to 2:1. The solvent for the naphthalene is preferably an inert saturated hydrocarbon such as heptane, cyclohexane, decahydronaphthalene or the like.

Although the alkylation may be carried out in various types of reactors, it is preferred that a super-atmospheric flow reactor be used in order to control the input and off-gas flow rate. Accordingly, although atmospheric pressure may be employed, it is preferred that super-atmospheric pressures be used whenever possible. Thus, to provide a reasonably uniform charging rate at low space velocities together with a pre-set off-gas rate to achieve a positive flow in the reactor, it is preferred that the reactor be operated under nitrogen pressure of from about 30–1000 p.s.i.g.

As before-mentioned, the catalyst for the alkylation step is a solid phosphoric acid on an inert carrier such as clay, kieselguhr, or the like, and is preferably kieselguhr containing from 10%–20% free $P_2O_5$ (45%–55% total $P_2O_5$). Catalysts of this type are generally available commercially, as for example, those solid phosphoric acid catalysts which are sold by Universal Oil Products. Contact of the feed with the catalyst is conveniently achieved by grinding and sizing the catalyst and diluting it with an inert filler such as magnesium silicate to form a catalyst bed for the reactor. The catalyst can be conveniently activated in situ by contacting it continuously with water or an alcohol, preferably one corresponding to the olefin feed, i.e. isopropyl or butyl alcohol. The alcohol or water is desirably introduced into the reaction by adding it directly to the feed charge in sufficient amounts to provide concentration in the case of the alcohol, of from about 100 to 3000 p.p.m. of alcohol based on the weight of the naphthalene.

Although the alkylation of naphthalene may take place over a wide range of conditions, under the preferred conditions mentioned above, the percentage conversion of naphthalene is about 50%–70% per pass (of the theoretical); the selectivity for the monalkylate is about 70%–90%; and the β- to α-isomer ratio is about 0.5–1.5. Moreover, under these conditions little or no polymerization of the olefin, e.g. polypropylene formation, takes place.

Following the alkylation of the naphthalene, the liquid alkylate product is collected, degassed to remove any light hydrocarbons, and then charged directly to the isomerization step where substantial portions of the α-isomer are converted to the corresponding β-isomer. In general, this step comprises contacting the liquid alkylate with anhydrous hydrofluoric acid as the isomerization catalyst. The isomerization should be carried out under the controlled conditions specified below in order to obtain the maximum conversion to the β-isomer with the minimum of side reactions such as dealkylation and/or alkyl or hydrogen disproportionation. After completion of the isomerization, the catalyzate is separated from the acid catalyst and distilled to recover the β-alkylnaphthalene in high purity, and usually greater than 90% purity.

The isomerization may be conveniently carried out in a liquid-liquid reactor to which has been charged the liquid product of the alkylation step and the anhydrous hydrofluoric acid. The contact time of the alkylate with the acid catalyst is preferably not more than about 1–3 hours, depending upon the temperature employed; after longer periods at room temperature little increase in the conversion to the β-isomer is noted. Instead, appreciable quantities of naphthalene and polyalkylates begin to appear as the result of dealkylation-disproportionation side reactions.

The isomerization is preferably carried out at room temperature, i.e. about 24°–28° C., although temperatures in the range of from about 0° C. to 50° C. may be employed. Ttemperatures above about 50° C. should be avoided because of the side reactions which take place, such as dealkylation or tar formation.

The final product, comprising about 90%–95% of the β-isomer and from 5%–10% of the α-isomer, is conveniently recovered by allowing the acid-hydrocarbon mixture to settle and form a two-phase system. The hydrocarbon layer is then conveniently drawn off, washed to remove traces of acid, and the washed layer distilled to remove the solvent for the naphthalene.

Although not specifically mentioned above, it should be noted that in the case of butene-1, and butene-2, there is obtained in the alkylation step a mixture of three different isomers which have been identified as 1-sec.-butylnaphthalene, 2-t-butylnaphthalene, and 2-sec.-butylnaphthalene. Notwithstanding this fact, it has been found that the first two of these three isomers disappear during the isomerization step to form the desired 2-sec.-butyl compound, and thus the formation of these intermediate isomers during the alkylation step has no effect on the recovery of the preferred isomer in high yield and purity.

The present invention is further illustrated with respect to specific embodiments thereof in the following examples.

EXAMPLES 1–17

Into a superatmospheric vertical tubular flow reactor measuring 13" x ½", equipped with a pre-heater, was charged 20 ml. of catalyst bed. The catalyst bed was prepared by grinding and sizing to 16–30 mesh 10 ml. of UOP No. 4 solid phosphoric acid (11.3% free, or 48.2% total $P_2O_5$ on kieselguhr) and diluting this acid with 10 ml. of 16–30 mesh magnesium silicate inert filler. The catalyst was treated prior to use by heating it at the reaction temperature of 270° C. with nitrogen flow for 1–2 hours. The pre-heater and reactor were heated to 270° C. by an electrically heated circular oven under nitrogen flow and controlled nitrogen pressure of 250 p.s.i.g. Several runs were made wherein a feed consisting of a liquid charge of 15% by volume of naphthalene dissolved in decahydronaphthalene, equimolar quantity of propylene (based on naphthalene), and 2000 p.p.m. isopropyl alcohol was charged under 250 p.s.i.g. nitrogen pressure into the preheater-reactor by a variable displacement diaphragm pump. The off-gas flow rate was 75–125 ml./min. The liquid alkylate product was collected in a high pressure liquid separator, degassed and analyzed by vapor phase chromatography. The reaction conditions of the several runs and analysis of each of the products are given in Table I. The abbreviations used in the following Table I are as listed below:

N = Naphthalene
1-iPrN = 1-isopropylnaphthalene
2-iPrN = 2-isopropylnaphthalene tion zone wherein said mixture is contacted at a temperature of about 0°–50° C. with anhydrous hydrofluoric acid; and (c) recovering β-monoalkylnaphthalene in high isomeric purity.

TABLE I.—ALKYLATION OF NAPHTHALENE WITH PROPYLENE

| Run No. | T., °C. (cat. bed) | LHSV [1] | $\frac{N}{C_3}=\left(\frac{m}{m}\right)$ | Product analysis (percent by VPC) | | | | $\frac{2\text{-iPrN}}{1\text{-iPrN}}\left(\frac{m}{m}\right)$ | Conversion, percent [3] | Selectivity, percent [4] |
|---|---|---|---|---|---|---|---|---|---|---|
| | | | | N | 1-iPrN | 2-iPrN | Others [2] | | | |
| 1 | 180 | 4.6 | 0.5 | 68.5 | 24.1 | 7.4 | 2–3 | 0.31 | 32 | >90 |
| 2 | 230 | 4.6 | 0.5 | 46.4 | 36.6 | 17.0 | 3–5 | 0.47 | 54 | >90 |
| 3 | 230 | 4.6 | 0.5 | 43.0 | 34.9 | 17.4 | 4.7 | 0.50 | 57 | >90 |
| 4 | 230 | 4.6 | 0.5 | 45.8 | 37.6 | 16.6 | 3–5 | 0.44 | 54 | >90 |
| 5 | 270 | 3.0 | 0.5 | 18.7 | 23.4 | 31.9 | 26.0 | 1.36 | 81 | 68 |
| 6 | 270 | 3.0 | 0.5 | 14.9 | 22.2 | 33.7 | 29.2 | 1.52 | 85 | 66 |
| 7 | 270 | 6.0 | 0.5 | 24.7 | 33.9 | 29.2 | 12.2 | 0.87 | 75 | 84 |
| 8 | 270 | 6.0→12.0 | 0.5 | 35.4 | 29.2 | 22.9 | 12.5 | 0.79 | 65 | 81 |
| 9 | 270 | 12.6 | 0.5 | 45.4 | 36.4 | 18.2 | 5–10 | 0.50 | 55 | 85 |
| 10 | 270 | 5.0 | 1.0 | 34.0 | 24.6 | 26.6 | 14.8 | 1.10 | 66 | 78 |
| 11 | 270 | 5.0 | 1.0 | 28.4 | 26.6 | 26.6 | 8.4 | 1.00 | 62 | 86 |
| 12 | 270 | 5.0 | 1.0 | 38.4 | 27.4 | 29.6 | 4.6 | 1.10 | 62 | 93 |
| 13 | 270 | 12.4 | 1.0 | 50.5 | 26.6 | 17.3 | 5.6 | 0.65 | 49 | 89 |
| 14 | 270 | 7.2 | 2.0 | 65.7 | 18.2 | 14.7 | 1.4 | 0.81 | 69 | >95 |
| 15 | 270 | 12.0 | 2.0 | 71.6 | 18.2 | 10.2 | | 0.56 | 57 | >95 |
| 16 | 270 | 4.0 | 2.0 | 66.2 | 19.6 | 14.2 | | 0.73 | 67 | >95 |
| 17 | 270 | 4.0 | 2.0 | 67.5 | 17.6 | 14.9 | | 0.85 | 65 | >95 |

[1] Liquid hourly space velocity for the combined liquid feed, based on the active catalyst.
[2] Di- and polyalkylate.
[3] Per pass conversion, based on the limiting reagent.
[4] Selectivity for the mono-alkylate.

EXAMPLE 18

Into a 75 ml. Hoke bomb equipped with a dip tube for sampling was placed a 10% by weight solution of 3.0 g. of mixed mono-isopropylnaphthalenes comprising about 75% of the α-isomer and 25% of the β-isomer dissolved in pentane. To this solution was added 20 ml. of anhydrous hydrofluoric acid. The mixture was shaken mechanically at room temperature and samples of the organic layer were withdrawn at 30, 130, and 240 minute time intervals. The isomerization was found to be essentially complete after 130 minutes; at 240 minutes there was practically no change, distribution consisting of about 95% β-isomer and about 5% of the α-isomer. At prolonged reaction periods of greater than 150 minutes, appreciable quantities (15–20%) of naphthalene and high alkylates appear as a result of dealkylation-disproportionation reactions.

What is claimed is:

1. A process for the preparation of β-monoalkylnaphthalenes in high isomeric purity which comprises:

(a) alkylating naphthalene with an olefin selected from the group consisting of propylene, butene-1 and butene-2 at a temperature in the range of from about 150° to 350° C. in the presence of a solid phosphoric acid catalyst and an activator therefor selected from the group consisting of water and an alcohol, wherein the liquid hourly space velocity for the combined liquid charge of the olefin, naphthalene, and alcohol is from about 1 to 20, the liquid hourly space velocity of the naphthalene alone is from about 0.1 to 1.0, said liquid hourly space velocities being based on the volume of active catalyst, and the mole ratio of naphthalene to olefin is from about 1:1 to 2:1, to form an isomeric mixture of mono-alkylnaphthalenes;

(b) charging said isomeric mixture to an isomerization zone wherein said mixture is contacted at a temperature of about 0°–50° C. with anhydrous hydrofluoric acid; and (c) recovering β-monoalkylnaphthalene in high isomeric purity.

2. The process according to claim 1 wherein the β-monoalkylnaphthalene is recovered in greater than about 90% isomeric purity.

3. The process according to claim 1 wherein naphthalene is alkylated with propylene at a temperature of from 260°–300° C. in the presence of a catalyst activator selected from the group consisting of water and isopropyl alcohol.

4. The process according to claim 1 wherein naphthalene is alkylated with butene-1 at a temperature of from 260° to 300° C. in the presence of a catalyst activator selected from the group consisting of water and butyl alcohol.

5. The process according to claim 1 wherein naphthalene is alkylated with butene-2 at a temperature of from 260° to 300° C. in the presence of a catalyst activator selected from the group consisting of water and butyl alcohol.

6. The process according to claim 1 wherein the mixed isomers are contacted with anhydrous hydrofluoric acid at a temperature of from 0°–50° C.

References Cited

UNITED STATES PATENTS 2,623,911  12/1952  Corson et al. _____ 260—674 XR
2,803,681   8/1957  McCaulay _____ 260—668
2,885,451   5/1959  Linn _____ 260—668

DELBERT E. GANTZ, Primary Examiner

C. R. DAVIS, Assistant Examiner

U.S. Cl. X.R.
260—671